United States Patent
Binek et al.

(10) Patent No.: US 11,543,133 B2
(45) Date of Patent: *Jan. 3, 2023

(54) SPALL PLATE FOR CONSUMABLE COMBUSTOR SUPPORT STRUCTURES

(71) Applicant: RAYTHEON TECHNOLOGIES CORPORATION, Farmington, CT (US)

(72) Inventors: Lawrence A. Binek, Glastonbury, CT (US); Sean R. Jackson, Palm City, FL (US); Evan J. Butcher, Suffield, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/550,703

(22) Filed: Dec. 14, 2021

(65) Prior Publication Data

US 2022/0107088 A1 Apr. 7, 2022

Related U.S. Application Data

(63) Continuation of application No. 16/577,649, filed on Sep. 20, 2019, now Pat. No. 11,262,077.

(51) Int. Cl.
   F23R 3/60       (2006.01)
   F23R 3/06       (2006.01)
   F23R 3/00       (2006.01)
   F23R 3/04       (2006.01)
   F02C 3/04       (2006.01)

(52) U.S. Cl.
   CPC ............. *F23R 3/60* (2013.01); *F02C 3/04* (2013.01); *F23R 3/002* (2013.01); *F23R 3/045* (2013.01); *F23R 3/06* (2013.01); *F05D 2230/10* (2013.01); *F05D 2230/31* (2013.01); *F23R 2900/00018* (2013.01)

(58) Field of Classification Search
   CPC .......... F05D 2230/10; F05D 2260/311; F05D 2260/607; F23R 3/045; F23R 3/002
   See application file for complete search history.

(56) References Cited

U.S. PATENT DOCUMENTS 3,038,309 A   6/1962   Waters
3,561,886 A   2/1971   Kreischer, Jr. et al.
(Continued)

FOREIGN PATENT DOCUMENTS

JP         54067107         5/1979

OTHER PUBLICATIONS

European Patent Office, European Search Report dated Feb. 8, 2021 in Application No. 2019663.7.
(Continued)

*Primary Examiner* — Stephanie Sebasco Cheng
(74) *Attorney, Agent, or Firm* — Snell & Wilmer L.L.P.

(57) ABSTRACT

A combustor may comprise an outer wall defining, at least, a portion of a combustion chamber. A dilution chute may extend from an interior surface of the outer wall. A support structure may extend between the dilution chute and the interior surface of the outer wall. A spall plate may extend from the interior surface of the outer wall. The spall plate may be located between the support structure and an outlet of the combustion chamber.

17 Claims, 7 Drawing Sheets

(56) References Cited

U.S. PATENT DOCUMENTS

| | | | | |
|---|---|---|---|---|
| 3,990,837 | A * | 11/1976 | Snell | F23R 3/04 |
| | | | | 60/752 |
| 4,776,765 | A | 10/1988 | Sumner et al. | |
| 5,261,224 | A * | 11/1993 | Shekleton | F23R 3/28 |
| | | | | 60/738 |
| 6,019,575 | A | 2/2000 | Boursy | |
| 6,931,862 | B2 | 8/2005 | Harris | |
| 7,194,866 | B1 | 3/2007 | Jones et al. | |
| 7,216,473 | B1 | 5/2007 | McArthur et al. | |
| 7,854,122 | B2 * | 12/2010 | Steele | F23R 3/06 |
| | | | | 60/754 |
| 8,215,919 | B2 | 7/2012 | Jewess et al. | |
| 8,438,858 | B1 | 5/2013 | Jones et al. | |
| 8,777,154 | B2 | 7/2014 | Alexander et al. | |
| 9,803,498 | B2 | 10/2017 | Jewess et al. | |
| 10,941,944 | B2 * | 3/2021 | Binek | F23R 3/343 |
| 11,262,077 | B2 * | 3/2022 | Binek | F23R 3/045 |
| 2012/0169326 | A1 | 7/2012 | Gopala et al. | |
| 2013/0025287 | A1 | 1/2013 | Cunha | |
| 2014/0208714 | A1 | 7/2014 | Jones et al. | |
| 2016/0025005 | A1 | 1/2016 | Jones et al. | |

OTHER PUBLICATIONS

USPTO, Restriction/Election Requirement dated Jun. 9, 2021 in U.S. Appl. No. 16/577,649.
USPTO, Notice of Allowance dated Sep. 16, 2021 in U.S. Appl. No. 16/577,649.

* cited by examiner

SPALL PLATE FOR CONSUMABLE COMBUSTOR SUPPORT STRUCTURES

CROSS-REFERENCE TO RELATED APPLICATIONS

This application is a continuation of, and claims priority to and the benefit of, U.S. application Ser. No. 16/577,649, filed Sep. 20, 2019 and entitled "SPALL PLATE FOR CONSUMABLE COMBUSTOR SUPPORT STRUCTURES," which is incorporated by reference herein in its entirety for all purposes.

FIELD

The present disclosure relates to aircraft engines, and, more specifically, to a spall plate for consumable combustor support structures.

BACKGROUND

Gas turbine engines, such as those used to power modern commercial and military aircraft, include a fan section to propel the aircraft, a compressor section to pressurize a supply of air from the fan section, a combustor section to burn a hydrocarbon fuel in the presence of the pressurized air, and a turbine section to extract energy from the resultant combustion gases in order to power the compressor and the fan sections. Miniature gas turbine engines operate in much the same way as conventional gas turbine engines operate in that a fuel is combusted in the presence of compressed air to generate high energy gases for producing thrust and powering a compressor. As with a conventional gas turbine engine, a turbine section is used to drive a compressor section to compress air for the combustion process and to eject gases at high velocity to produce thrust.

While miniature gas turbine engines often operate under expendable circumstances, it is nevertheless desirable for the engines to exhibit reliability and, at the same time, be cost effective. Additive support structures may be employed to support formation of various additively manufactured components in the combustor. During operation, portions of the additive support structures may erode. The eroded material can collect or impact on critical surfaces including turbine nozzles and rotating components. The eroded material can damage components during operation, disrupt flow patterns, and/or lead to imbalance of rotating components, which tends to negatively impact engine performance.

SUMMARY

A combustor is disclosed herein. In accordance with various embodiments, the combustor may comprise an outer wall defining, at least, a portion of a combustion chamber. A dilution chute may extend from an interior surface of the outer wall. A support structure may extend between the dilution chute and the interior surface of the outer wall. A spall plate may extend from the interior surface of the outer wall. The spall plate may be located between the support structure and an outlet of the combustion chamber.

In various embodiments, the spall plate may be forward of the dilution chute. In various embodiments, a face of the spall plate may be approximately perpendicular to the interior surface of the outer wall.

In various embodiments, a first portion of the support structure may be configured to melt in response to ignition of a fuel air mixture within the combustion chamber. In various embodiments, a flow of melted support structure material flows toward a face of the spall plate in response to ignition of the fuel air mixture, and the face of the spall plate may be approximately perpendicular to a direction of the flow of melted support structure material.

In various embodiments, an axial surface of the spall plate may extend from the face of the spall plate toward the outlet of the combustion chamber. The axial surface may be approximately perpendicular to the face of the spall plate.

In various embodiments, at least one of a thickness or a density of the first portion of the support structure may be different from at least one of a thickness or a density of a second portion of the support structure. In various embodiments, the first portion of the support structure may be located closer to the interior surface of the outer wall as compared to the second portion.

In various embodiments, the spall plate and the outer wall may be formed using the same material.

A miniature gas turbine engine is also disclosed herein. In accordance with various embodiments, the miniature gas turbine engine may comprise a compressor wheel configured to rotate about an engine central longitudinal axis. A combustor may be located downstream of the compressor wheel. The combustor may comprise a dilution chute extending from an interior surface of the combustor, a support structure extending between the dilution chute and the interior surface of the combustor, and a spall plate extending from the interior surface of the combustor. The spall plate may be located between the support structure and an outlet of the combustor.

In various embodiments, a turbine wheel may located downstream of the combustor. A diffuser may be located between the compressor wheel and the combustor. A turbine nozzle may be located between the outlet of the combustor and the turbine wheel.

In various embodiments, a face of the spall plate may be approximately perpendicular to the engine central longitudinal axis. In various embodiments, the combustor may further comprise an outer wall, an inner wall, and a connecting wall extending between the outer wall and the inner wall. A first portion of the support structure may be configured to melt in response to ignition of a fuel air mixture within a combustion chamber defined by the outer wall, the inner wall, and the connecting wall.

In various embodiments, the spall plate may comprise a face extending from the interior surface of the combustor and an axial surface extending from the face of the spall plate toward the turbine nozzle. The axial surface may be approximately perpendicular to the face of the spall plate.

In various embodiments, at least one of a thickness or a density of the first portion of the support structure may be different from at least one of a thickness or a density of a second portion of the support structure.

In various embodiments, the spall plate and the outer wall are formed using the same material.

A method of making a combustor is also disclosed herein. In accordance with various embodiments, the method may comprise the steps of forming a support structure extending from an interior surface of the combustor, forming a dilution chute extending from the interior surface of the combustor, and forming a spall plate at an outlet of the combustor. The support structure may extend from the interior surface to the dilution chute.

In various embodiments, the method may further comprise forming the support structure and the spall plate using additive manufacturing. In various embodiments, the method may further comprise forming a first portion of the support structure having a first thickness and second portion of the support structure have a second thickness different from the first thickness.

In various embodiments, a face of the spall plate may be approximately perpendicular to an engine central longitudinal axis.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that logical aerodynamic, thermodynamic, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected, or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not necessarily be repeated herein for the sake of clarity.

As used herein, "aft" refers to the direction associated with the tail (i.e., the back end) of an aircraft, or generally, to the direction of exhaust of the gas turbine engine. As used herein, "forward" refers to the direction associated with the nose (i.e., the front end) of an aircraft, or generally, to the direction of flight or motion.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component.

As used herein, the term "additive manufacturing" encompasses any method or process whereby a three-dimensional object is produced by creation of a substrate or material, such as by addition of successive layers of a material to an object to produce a manufactured product that has an increased mass or bulk at the end of the additive manufacturing process as compared to the beginning of the process. In contrast, traditional (i.e., non-additive) manufacturing by machining or tooling typically relies on material removal or subtractive processes, such as cutting, machining, extruding, lathing, drilling, grinding, stamping, and/or the like, to produce a final manufactured object that has a decreased mass or bulk relative to the starting workpiece. Other traditional, non-additive manufacturing methods include forging or casting, such as investment casting, which utilizes the steps of creating a form, making a mold of the form, and casting or forging a material (such as metal) using the mold. As used herein, the term "additive manufacturing" should not be construed to encompass a joining of previously formed objects.

A variety of additive manufacturing technologies are commercially available. Such technologies include, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and digital light processing. These technologies may use a variety of materials as substrates for an additive manufacturing process, including various plastics and polymers, metals and metal alloys, ceramic materials, metal clays, organic materials, and the like. Any method of additive manufacturing and associated compatible materials, whether presently available or yet to be developed, are intended to be included within the scope of the present disclosure.

Figure 1:
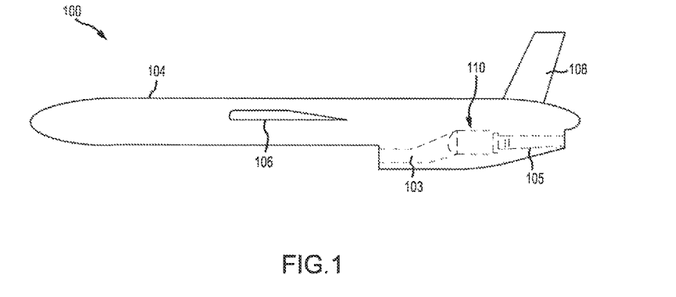
FIG. 1 illustrates a schematic view of a vehicle including a miniature gas turbine engine, in accordance with various embodiments.

With reference to FIG. 1, a vehicle 100 having a miniature gas turbine engine 110 is illustrated, in accordance with various embodiments. Vehicle 100 includes a fuselage 104, which further includes a wing 106 (or a pair of wings) and a rudder 108 or a stabilizer. In various embodiments, fuselage 104 also includes an intake duct 103 and an exhaust duct 105, between which is disposed miniature gas turbine engine 110. Intake duct 103 is open to the outside of fuselage 104 such that ambient air is permitted to enter miniature gas turbine engine 110 thru intake duct 103. As described further below, in various embodiments, miniature gas turbine engine 110 compresses and mixes the ambient air with a fuel carried onboard vehicle 100 to carry out a combustion process for producing thrust. Exhaust gas produced by the combustion process is expelled from miniature gas turbine engine 110 to produce the thrust and is passed from vehicle 100 through exhaust duct 105. In various embodiments, miniature gas turbine engine 110 is coupled to an exterior of the fuselage 104 by conventional means and operates in much the same manner as herein described. Vehicle 100 illustrated in FIG. 1 is representative of various reusable or single-use or expendable applications. For example, in various embodiments, vehicle 100 may comprise a reconnaissance drone aircraft. Thus, vehicle 100 may be called upon to perform important missions and flight objectives that benefit from reliable performance of miniature gas turbine engine 110. Furthermore, it is desirable that miniature gas turbine engine 110 be inexpensive in order to reduce costs associated with missions in which the vehicle 100 is expendable.

Figure 2A:
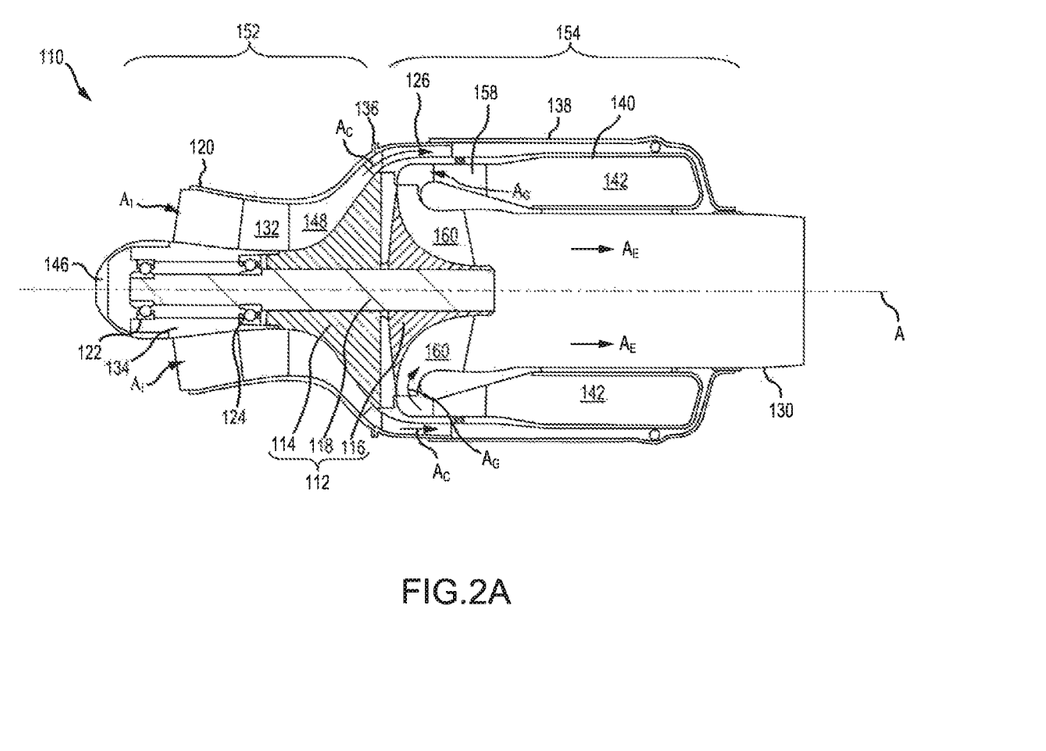
FIG. 2A illustrates a schematic cross sectional view of a miniature gas turbine engine, in accordance with various embodiments.

Referring now to FIG. 2A, a cross sectional, schematic view of miniature gas turbine engine 110 is provided. In various embodiments, miniature gas turbine engine 110 includes a rotor assembly 112, which comprises three main components: a compressor wheel 114, a turbine wheel 116, and a turbine shaft 118. Miniature gas turbine engine 110 also includes an inlet housing 120, a forward bearing 122, an aft bearing 124, a diffuser 126, a combustor 140, a turbine nozzle 158, an exhaust nozzle 130, one or more struts 132, and a shaft support 134. In various embodiments, a radial interference fit is utilized to retain compressor wheel 114 and turbine wheel 116 on turbine shaft 118. Turbine shaft 118 is configured to rotate within forward bearing 122 and aft bearing 124. The rotating components of miniature gas turbine engine 110 are configured generally to rotate about an engine central longitudinal axis A.

Shaft support 134 comprises an annular structure into which turbine shaft 118 is inserted. Shaft support 134 is maintained stationary through connection with struts 132, which are coupled to inlet housing 120. Struts 132 extend radially between shaft support 134 and inlet housing 120. Forward bearing 122 and aft bearing 124 are disposed within shaft support 134 to support turbine shaft 118 at axially displaced locations. End cap 146 is located around shaft support 134 to seal forward and aft bearings 122, 124 within shaft support 134. Turbine shaft 118 is configured to rotate about engine central longitudinal axis A within shaft support 134 and inlet housing 120.

In various embodiments, diffuser 126 is connected to inlet housing 120 using, for example, threaded fasteners at a flanged coupling 136. A combustor housing 138 extends axially aft from diffuser 126 to surround combustor 140. Combustor 140 defines a combustion chamber 142. In various embodiments, combustion chamber 142 comprises an annular hollow body in which the combustion process of miniature gas turbine engine 110 occurs. In various embodiments, combustor housing 138 may be connected to diffuser 126 and to exhaust nozzle 130.

In various embodiments, inlet housing 120 is configured to receive a flow of inlet air $A_I$ from an intake duct, such as, for example, intake duct 103 described above with reference to FIG. 1. In various embodiments, end cap 146 diverts inlet air $A_I$ around shaft support 134 and into inlet housing 120. Struts 132 may also function as inlet guide vanes to direct inlet air $A_I$ into compressor wheel 114. In various embodiments, compressor wheel 114 includes a plurality of compressor blades 148. Compressor blades 148 are disposed on a radially outward face of compressor wheel 114. Compressor blades 148 extend from the radially outward face of compressor wheel 114 toward inlet housing 120. Compressor blades 148 comprise aerodynamically contoured blades that face the upstream direction where inlet air $A_I$ is received. The surface of compressor wheel 114 slopes radially outward toward inlet housing 120 so as to comprise a centrifugal or radial flow compressor. The cross sectional area of the plurality of compressor blades 148 decreases along a flow path defined by compressor wheel 114 and inlet housing 120 such that intake air $A_I$ is compressed to form a flow of compressed air $A_C$ at the outlet of compressor wheel 114. In this regard, compressed air $A_C$ output from compressor wheel 114 is input into diffuser assembly 126.

In accordance with various embodiments, diffuser 126 may connect a cold section 152 of miniature gas turbine engine 110 and a hot section 154 of miniature gas turbine engine 110. Compression of inlet air $A_I$ occurs in cold section 152. Combustion of fuel occurs in hot section 154. Cold section 152 may include, for example, compressor wheel 114 and inlet housing 120. Hot section 154 may include, for example, combustor 140, turbine nozzle 158, turbine wheel 116, and exhaust nozzle 130.

Diffuser 126 guides compressed air $A_C$ aft toward combustor 140. Turbine nozzle 158 guides the combustion gases $A_G$ output from combustor 140 toward turbine wheel 116. In various embodiments, compressed air $A_C$ enters diffuser 126. Diffuser 126 orients and conditions the flow of compressed air $A_C$ prior to compressed air $A_C$ entering combustor 140. Combustion gases $A_G$ output from combustor 140 enter turbine nozzle 158. Turbine nozzle 158 orients and conditions the flow of combustion gases $A_G$ output from combustor 140 before the combustion gases $A_G$ enter turbine wheel 116.

In various embodiments, combustor 140 is located aft of turbine wheel 116 and fluidically between compressor wheel 114 and turbine wheel 116 such that fluid (e.g., air). This arrangement may be referred to as a reverse flow combustor. Combustor 140 is configured to transform the aftward flow of the compressed air $A_C$ to a forward flow of combustion gases $A_G$. As discussed in further detail below, compressed air $A_C$ and a supply of fuel are injected into combustion chamber 142. The fuel is ignited within combustion chamber 142 to initiate and sustain the combustion process. The combustion process generates combustion gases $A_G$ at high temperature and energy. The flow of combustion gases $A_G$ exiting combustion chamber 142 are directed toward turbine wheel 116 by turbine nozzle 158.

Combustion gases $A_G$ output from combustor 140 impinge upon a plurality of turbine blades 160 of turbine wheel 116, whereupon turbine blades 160 extract energy from combustion gases $A_G$ to turn both turbine wheel 116 and compressor wheel 114. Turbine wheel 116 comprises a radially outward face from which turbine blades 160 extend. Turbine blades 160 may comprise aerodynamically contoured blades configured to expel exhaust gases $A_E$ into exhaust nozzle 130. The radially outward face of turbine wheel 116 slopes radially inward in the direction of flow (e.g., a forward to aft direction) so as to comprise a radial flow turbine. A cross-section area of turbine blades 160 may increase in a downstream, or generally aft, direction, such that exhaust gas $A_E$ expands as it exits turbine wheel 116 and enters exhaust nozzle 130. Compressor wheel 114, through turbine shaft 118 and the turbine wheel 116, rotates to continuously compress inlet air $A_I$ and sustain the combustion process. Exhaust gases $A_E$ produce thrust to drive miniature gas turbine engine 110 in the forward direction as the exhaust gases $A_E$ exit exhaust nozzle 130 and, subsequently, an exhaust duct, such as, for example, the exhaust duct 105 described above with reference to FIG. 1.

Figure 2B:
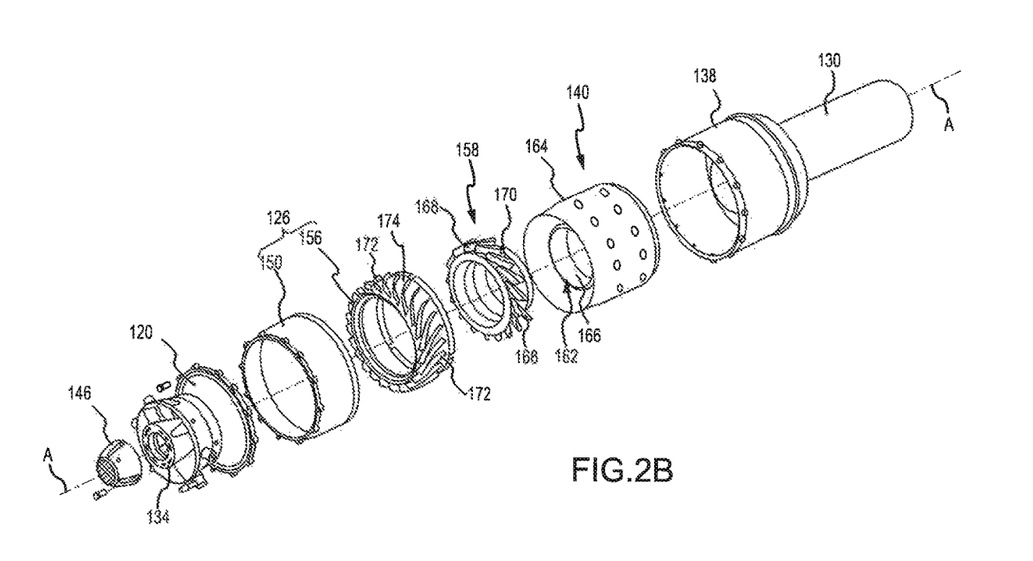
FIG. 2B illustrates an exploded view of static components of a miniature gas turbine engine, in accordance with various embodiments.

With reference to FIG. 2B, various static (i.e., non-rotating) structures of miniature gas turbine engine 110 are illustrated. In accordance with various embodiments, end cap 146, inlet housing 120, diffuser 126, turbine nozzle 158, combustor 140, combustor housing 138, and exhaust nozzle 130 are each static structures of miniature gas turbine engine 110. Stated differently, end cap 146, inlet housing 120, diffuser 126, turbine nozzle 158, combustor 140, combustor housing 138, and exhaust nozzle 130 do not rotate relative to engine central longitudinal axis A. Combustor housing 138 receives combustor 140 (i.e., combustor 140 is located within combustor housing 138). Turbine nozzle 158 is located at an outlet 162 of combustor 140. Turbine nozzle 158 is located radially between an outer wall 164 and an inner wall 166 of combustor 140. Turbine nozzle 158 includes a plurality of vanes 168 extending from a radially outward surface 170 of turbine nozzle 158. Vanes 168 orient and condition the combustion gases output from combustor 140.

In various embodiments, a diffuser 126 is located axially between inlet housing 120 and combustor housing 138. Diffuser may include a diffuser housing 150 and a flow diverter 156. Diffuser housing 150 may be coupled to inlet housing 120 and combustor housing 138. In various embodiments, diffuser housing 150 and flow diverter 156 may be integral with one another, for example, they may be formed from a single casting. Flow diverter 156 is located at a forward end of combustor 140. Diffuser 126 is located generally radially outward of outer wall 164 of combustor 140. Diffuser 126 includes a plurality of vanes 172 extending from a radially outward surface 174 of flow diverter 156. Vanes 172 extend radially between radially outward surface 174 of flow diverter 156 and diffuser housing 150. Vanes 172 orient and condition the flow of compressed air $A_C$ received from compressor wheel 114 (FIG. 2A). Inlet housing 120 is coupled to the forward end of diffuser 126. End cap 146 is coupled to shaft support 134 at the forward end of inlet housing 120.

Figure 3A:
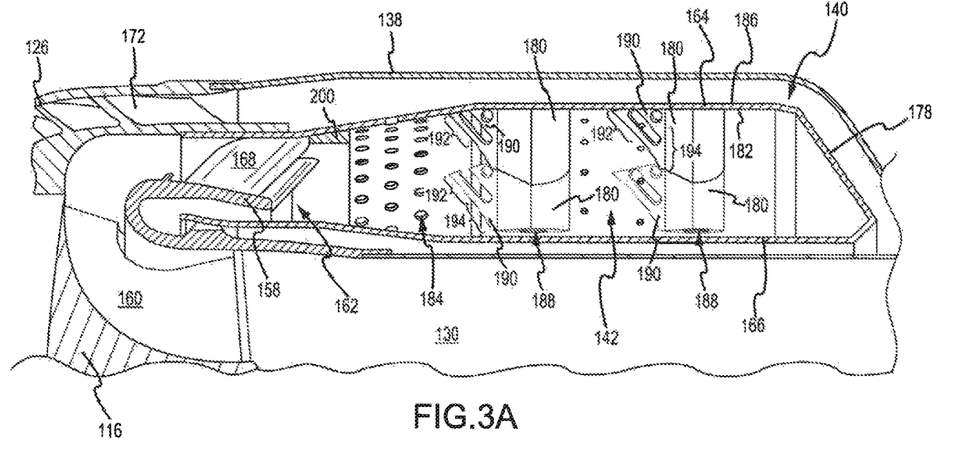
FIG. 3A illustrates a schematic cross sectional view of the combustor section of a miniature gas turbine engine, in accordance with various embodiments.

With reference to FIG. 3A, additional details of combustor 140 are illustrated. In accordance with various embodiments, combustor 140 includes a combustion chamber 142 defined by outer wall 164, inner wall 166, and an aft (or connecting) wall 178. Inner wall 166 is located radially inward of outer wall 164. Aft wall 178 extends between outer wall 164 and inner wall 166. Outer wall 164, inner wall 166, and aft wall 178 may define generally U-shaped combustion chamber 142. Combustion chamber 142 forms a region for mixing of compressed air and fuel. Combustion chamber 142 may be configured to direct the flow of combustion gases $A_G$ produced by ignition of the fuel air mixture toward outlet 162 of combustion chamber 142. Outlet 162 of combustion chamber 142 is axially opposite aft wall 178. Outlet 162 is located at an inlet of turbine nozzle 158. The combustion gases $A_G$ may be driven downstream and/or forward toward outlet 162 and turbine nozzle 158.

Outer wall 164, inner wall 166, and aft wall 178 may be made of any suitable heat tolerant material. In this manner, outer wall 164, inner wall 166, and aft wall 178 may be substantially resistant to thermal mechanical fatigue in order to inhibit cracking of combustor 140. In various embodiments, outer wall 164, inner wall 166, and/or aft wall 178 may be made from a nickel-based super alloy.

In various embodiments, outer wall 164, inner wall 166, and/or aft wall 178 may be formed using additive manufacturing. For example, outer wall 164, inner wall 166, and/or aft wall 178 may be formed using laser-based powder bed fusion, polyjet 3D printing, electron beam freeform fabrication, or any other suitably additive manufacture technique.

In accordance with various embodiments, one or more dilution chutes 180 may be formed extending from an interior surface 182 of outer wall 164. As used herein, an "interior surface" refers to a surface of a combustor or of a combustor wall that is oriented toward combustion chamber 142. In various embodiments, one or more dilution chutes 180 may also be formed extending from an interior surface of inner wall 166 and/or an interior surface of aft wall 178.

In various embodiments, outer wall 164 may define a plurality of apertures 184. Apertures 184 may be formed completely through outer wall 164 such that apertures 184 extend from an exterior surface 186 of outer wall 164 to interior surface 182 of outer wall 164. As used herein, an "exterior surface" refers to a surface of a combustor or of a combustor wall that is oriented away combustion chamber 142. In various embodiments, apertures 184 may also be formed through (i.e., defined by) inner wall 166 and/or or aft wall 178 of combustor 140.

Dilution chutes 180 may be formed using additive manufacturing, for example, using laser-based powder bed fusion or any other suitable additive manufacturing technique. Dilution chutes 180 may be formed from an additively manufactured metal or metal alloy. For example, dilution chutes may comprise an additively manufactured nickel-based super alloy, titanium or titanium alloy, or any other metal or metal alloy that may be additively manufactured. In various embodiments, dilution chutes 180 are additively manufactured using the same material as outer wall 164 of combustor 140.

Dilution chutes 180 may be configured to deliver air and/or a fuel air mixture into combustion chamber 142. In this regard, each dilution chute 180 defines an injection channel 188. Compressed air and/or an fuel air mixture may be delivered into combustion chamber 142 via injection channels 188. Dilution chutes 180 may be oriented at various angles relative to interior surface 182. The orientation of each dilution chute 180 may be selected to promote swirling and/or other directional components of the combustion gases $A_G$ flowing around and through combustion chamber 142.

In accordance various embodiments, one or more support structures 190 may be formed between interior surface 182 and each dilution chute 180. In various embodiments, support structures 190 may be formed using additive manufacturing. Support structures 190 may be formed to support formation of dilution chutes 180 at various angles relative to interior surface 182. Stated differently, to form dilution chutes 180 having the desired geometry and/or at the desired angle relative to interior surface 182 one or more support structures 190 may be formed extending from interior surface 182 to support the deposition of the material (e.g., the metal or metal alloy) used to form dilution chutes 180. In various embodiments, support structures 190 are additively manufactured using the same material as dilution chutes 180 and/or as outer wall 164 of combustor 140.

During operation of miniature gas turbine engine 110 (FIG. 1), a fuel air mixture is ignited in combustion chamber 142. It may be desirable for the fuel air mixture and/or combustion gases $A_G$ to flow along interior surface 182. Support structures 190 may undesirably encumber or divert flow along interior surface 182. Removing support structures 190 may thus increase engine efficiency and performance.

Forming support structures 190 via additive manufacturing allows the geometry and the materials of support structures 190 to be tailored such that the combustion gases within combustion chamber 142 will melt desired portions of support structures 190. In various embodiments, at least, a first portion 192 of support structures 190 is configured to be consumed (i.e., removed) by the combustion gases in combustion chamber 142. For example, first portions 192 of support structures 190 are configured to liquify in response to ignition of the fuel air mixture in combustion chamber 142. In various embodiments, a thickness of first portions 192 of support structures 190 is less than the thickness of a second portion 194 of support structure 190, thereby causing first portion 192 to melt prior to second portion 194. In various embodiments, the combustion gases within combustion chamber 142 may not melt at least a portion of second portion 194. In various embodiments, the thickness of first portion 192 may be between 5% and 80% of the thickness of second portion 194. In various embodiments, the thickness of first portion 192 may be between 15% and 50% of the thickness of second portion 194.

In various embodiments, a density of first portions 192 of support structures 190 is less than the density of second portions 194 of support structure 190, thereby causing first portions 192 to melt prior to second portions 194. In various embodiments, the material of first portions 192 is different from the material of second portions 194. In various embodiments, a melting point of the material of first portions 192 is less than a melting point of the material of second portions 194.

The thickness, density, and/or material of first portions 192 is/are selected such that igniting the fuel air mixture within combustion chamber 142 will create combustion gas of sufficient temperature to melt (i.e., liquify) first portions 192. In various embodiments, first portions 192 are located closer to interior surface 182 than second portions 194. For example, in various embodiments, first portion 192 are located immediately adjacent to interior surface 182.

In accordance with various embodiments, during operation of miniature gas turbine engine 110, the fuel air mixture within combustion chamber 142 is ignited and, at least, first portions 192 of support structures 190 liquify. In various embodiments, support structures 190 may completely liquify (i.e., first portions 192 and second portions 194 may both liquify) leaving just dilution chutes 180 extending from interior surface 182. The melted material of support structures 190 flows downstream along interior surface 182 toward outlet 162 of combustion chamber 142. As described in further detail below, a spall plate 200 is located between outlet 162 and support structures 190. Spall plate 200 is configured to block or reduce the flow of the melted material of support structures 190 into turbine nozzle 158.

Figure 3B:
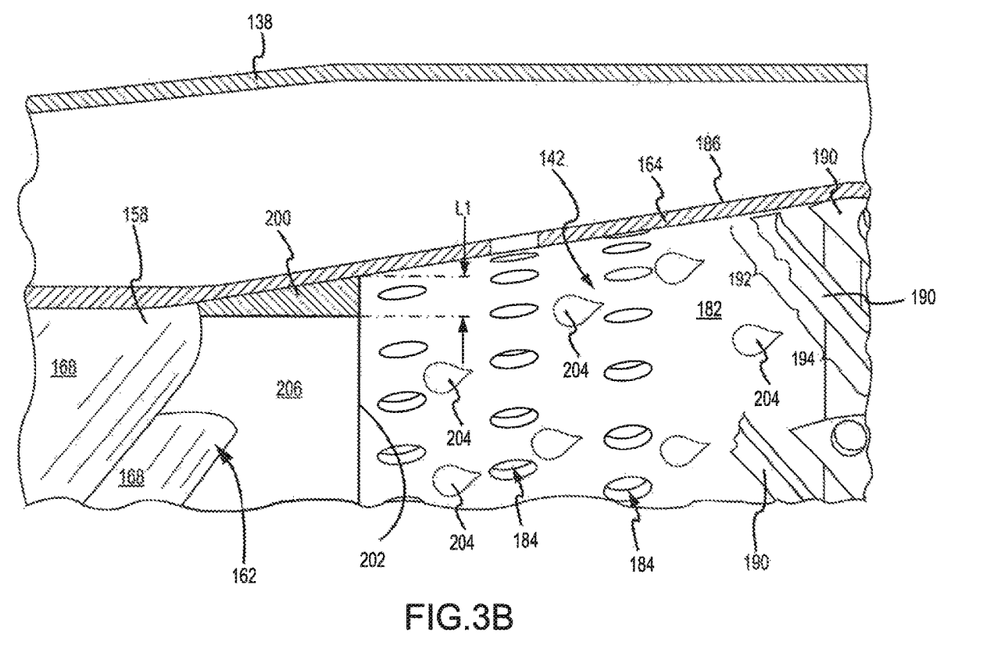
FIG. 3B illustrates a schematic cross sectional view of a spall plate located in the combustor section of a miniature gas turbine engine, in accordance with various embodiments.

With reference to FIG. 3B, additional detail of spall plate 200 are illustrated. A face 202 of spall plate 200 is oriented toward dilution chutes 180. Face 202 extends radially inward from interior surface 182 of outer wall 164. Face 202 is configured to be approximately perpendicular to the direction of flow of melted material 204 from support structures 190. As used in the previous context only, "approximately" means±5°. As used herein, "the direction of flow" of melted material 204 refers to the axial flow direction of melted material 204. For example, melted material 204 may also flow slightly circumferentially and/or radially. In various embodiments, face 202 may be approximately perpendicular to engine central longitudinal axis A, with momentary reference to FIG. 2A. As used in the previous context only, "approximately" means±5°.

Spall plate 200 includes an axial surface 206. In various embodiments, axial surface 206 may be approximately perpendicular to face 202. As used in the previous context only, "approximately" means±5°. Axial surface 206 may extend axially (e.g., forward) from face 202. Axial surface 206 may extend from face 202 to turbine nozzle 158. The axial length of axial surface 206 may be selected such that face 202 will be located as close as possible to support structure 190 without radially overlapping apertures 184. In various embodiments, the radial length L1 of face 202 is based on the volume of the material that will melt from support structures 190. For example, the greater the volume of first portion 192 the greater the radial length L1 of face 202. In various embodiments, radial length L1 is between 0.100 inches and 0.025 inches (0.254 cm and 0.064 cm). In various embodiments, radial length L1 is between 0.085 inches and 0.035 inches (0.216 cm and 0.089 cm). In various embodiments, radial length L1 may be about 0.045 inches (0.114 cm). As used in the previous context only "about" means±0.01 inches (±0.025 cm).

Spall plate 200 may be integral (e.g., manufactured as part of) to outer wall 164. As used herein, "integral" means forming one, single continuous piece. In various embodiments, spall plate 200 may be formed separately from outer wall 164 (i.e., formed separately and then attached to interior surface 182. Spall plate 200 may be formed using additive manufacturing, for example, using laser-based powder bed fusion or any other suitable additive manufacturing technique. Spall plate 200 may be formed from an additively manufactured metal or metal alloy. For example, spall plate 200 may comprise an additively manufactured nickel-based super alloy, titanium alloy, or any other metal or metal alloy that may be additively manufactured. In various embodiments, spall plate 200 may be additively manufactured using the same material as outer wall 164 and/or the same material as dilution chutes 180. In this regard, the material of spall plate 200 is configured to withstand (e.g., has a melting point greater than) the high temperatures experienced in combustion chamber 142.

Figure 3C:
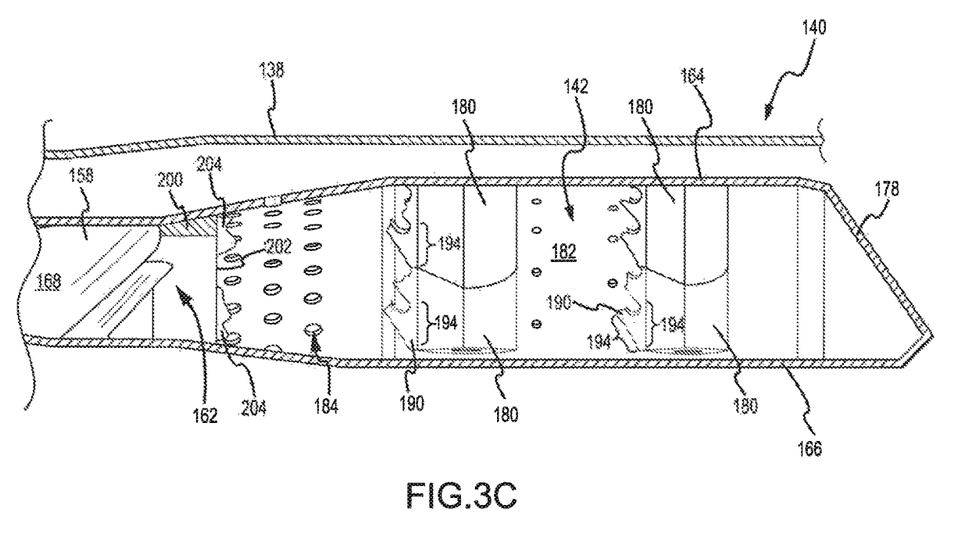
FIG. 3C illustrates a schematic cross sectional view of a spall plate located in the combustor section of a miniature gas turbine engine after support structure erosion, in accordance with various embodiments.

FIG. 3C shows combustion chamber 142 after portions of support structures 190 have been consumed (e.g., melted). In accordance with various embodiments, during operation of miniature gas turbine engine 110, the fuel air mixture within combustion chamber 142 is ignited and, at least a portion (e.g., first portion 192 in FIGS. 3A and 3B) of support structures 190 liquefies. The melted material 204 from support structures 190 contacts face 202. The cooler temperature of spall plate 200 may cause melted material 204 may solidify. In various embodiments, at least, a portion (e.g., second portion 194) of support structure is not consumed. Spall plate 200 thus blocks or reduces a flow of melted material 204 from entering turbine nozzle 158 and turbine wheel 116. Solidifying melted material 204 on spall plate 200 tends decrease occurrences of melted material 204 from solidifying on critical surfaces such as the surfaces of turbine nozzle 158 and/or turbine wheel 116, which tends to reduce flow pattern disturbances and imbalance of rotating components.

Figure 4:
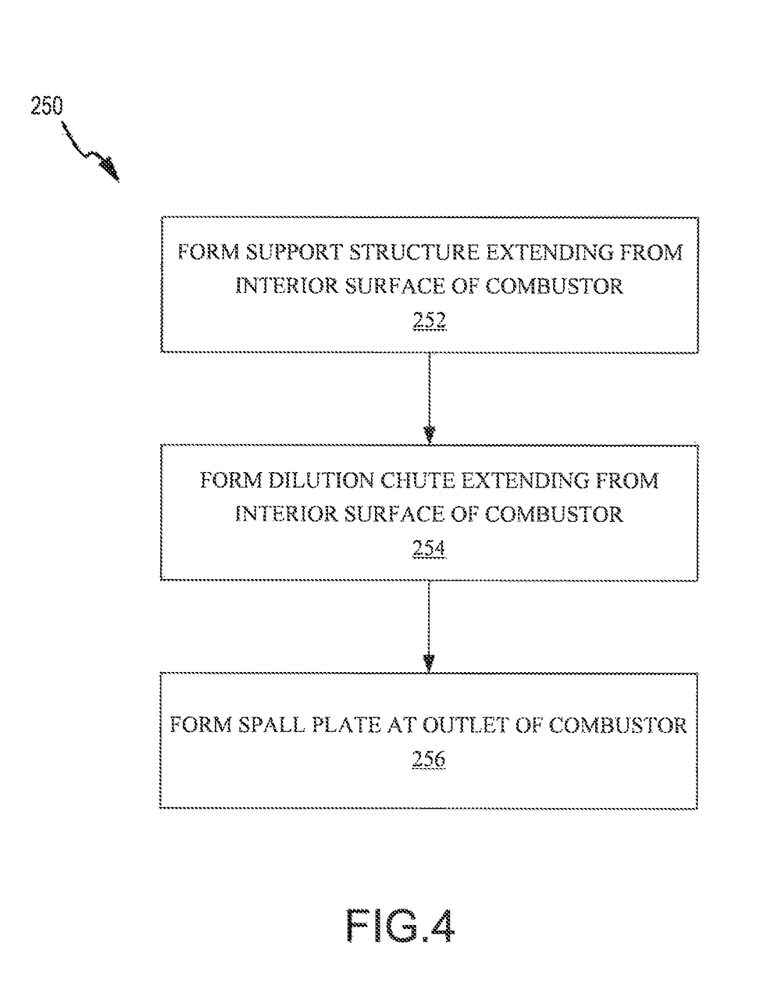
FIG. 4 illustrates a method of making a combustor, in accordance with various embodiments.

Referring now to FIG. 4, a method 250 of making a combustor is illustrated, in accordance with various embodiments. Method 250 may include forming a support structure extending from an interior surface of the combustor (step 252), forming a dilution chute extending from the interior surface of the combustor (step 254), forming a spall plate at an outlet of the combustor (step 256).

In various embodiments, step 252 may comprise forming a first portion of the support structure using a material different from a material of a second portion of the support structure. In various embodiments, method 250 may comprise forming the support structure, the dilution chute and/or the spall plate using additive manufacturing.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A combustor for a gas turbine engine, comprising:
   a wall defining, at least, a portion of a combustion chamber;
   a dilution chute extending from an interior surface of the wall and into the combustion chamber;
   a support structure extending between the dilution chute and the interior surface of the wall,
   wherein at least a first portion of the support structure is configured to melt in response to a combustion gas being produced in the combustion chamber; and
   a spall plate extending into the combustion chamber from the interior surface of the wall,
   the spall plate being located between the support structure and an outlet of the combustion chamber,
   wherein a face of the spall plate is located in a flow path of melted support structure material and obstructs the melted support structure material from flowing out the outlet of the combustion chamber.

2. The combustor of claim 1, wherein the spall plate is forward of the dilution chute.

3. The combustor of claim 1, wherein the face of the spall plate is approximately perpendicular to the interior surface of the wall.

4. The combustor of claim 1, wherein the face of the spall plate is approximately perpendicular to a direction in which the melted support structure material flows.

5. The combustor of claim 1, wherein an axial surface of the spall plate extends from the face of the spall plate toward the outlet of the combustion chamber, and wherein the axial surface is approximately perpendicular to the face of the spall plate.

6. The combustor of claim 1, wherein at least one of a thickness or a density of the first portion of the support structure is different from at least one of a thickness or a density of a second portion of the support structure.

7. The combustor of claim 6, wherein the first portion of the support structure contacts the interior surface of the wall and the second portion of the support structure contacts the dilution chute.

8. The combustor of claim 1, wherein the spall plate and the wall are formed using the same material.

9. A miniature gas turbine engine, comprising:
   a compressor wheel configured to rotate about an engine central longitudinal axis;
   a combustor defining a combustion chamber and located downstream of the compressor wheel; and
   a turbine nozzle located at an outlet of the combustion chamber,
   a support structure extending between the dilution chute and an interior surface of the combustor,
   wherein at least a first portion of the support structure is configured to melt in response to a combustion gas being produced in the combustion chamber; and
   a means for blocking or reducing melted support structure material from flowing out the outlet of the combustor and into the turbine nozzle, the means for blocking or reducing located between the support structure and the outlet of the combustor and extending into the combustion chamber from the interior surface of the combustor.

10. The miniature gas turbine engine of claim 9, further comprising: a turbine wheel located downstream of the combustor; and a diffuser located between the compressor wheel and the combustor, wherein the turbine nozzle is located between the outlet of the combustor and the turbine wheel.

11. The miniature gas turbine engine of claim 10, wherein the means for blocking or reducing the melted support structure material from flowing out the outlet of the combustor includes a face that is oriented approximately perpendicular to the engine central longitudinal axis.

12. The miniature gas turbine engine of claim 9, wherein the combustor further comprises an outer wall, an inner wall, and a connecting wall extending between the outer wall and the inner wall, and wherein the first portion of the support structure extends from one of the inner wall or the outer wall, and wherein the combustion chamber is defined by the outer wall, the inner wall, and the connecting wall.

13. The miniature gas turbine engine of claim 9, wherein at least one of a thickness or a density of the first portion of the support structure is different from at least one of a thickness or a density of a second portion of the support structure.

14. The miniature gas turbine engine of claim 13, wherein the first portion of the support structure contacts the interior surface of the combustor, and wherein the second portion of the support structure contacts the dilution chute.

15. A method of making a combustor for a gas turbine engine, comprising:
forming a support structure extending from an interior surface of the combustor, the interior surface defining a combustion chamber of the combustor;
forming a dilution chute extending from the interior surface of the combustor,
wherein the support structure extends from the interior surface to the dilution chute;
forming a spall plate on the interior surface of the combustor between the support structure and an outlet of the combustor, the spall plate extending into the combustion chamber; and
removing at least a first portion of the support structure by generating a combustion gas of sufficient temperature to melt the first portion of the support structure within the combustion chamber,
wherein the spall plate is configured to obstruct the melted support structure material from flowing out the outlet of the combustor.

16. The method of claim 15, further comprising forming the support structure and the spall plate using additive manufacturing.

17. The method of claim 15, further comprising forming the first portion of the support structure having a first thickness and a second portion of the support structure having a second thickness different from the first thickness.

* * * * *